United States Patent [19]
Walker et al.

[11] Patent Number: 5,962,135
[45] Date of Patent: Oct. 5, 1999

[54] CARBON/CARBON FRICTION MATERIAL

[75] Inventors: Terence Bryan Walker, South Bend, Ind.; Richard J. Donaldson, Newfield; Philip J. Whalen, Sparta, both of N.J.

[73] Assignee: AlliedSignal Inc., Morristown, N.J.

[21] Appl. No.: 08/960,664

[22] Filed: Oct. 3, 1997

Related U.S. Application Data

[63] Continuation-in-part of application No. 08/833,756, Apr. 9, 1997, abandoned.

[51] Int. Cl.$^6$ ...................................................... B32B 9/00
[52] U.S. Cl. ......................... 428/408; 428/212; 428/368; 428/426; 428/428; 428/446; 428/689; 428/669; 428/701; 428/702; 428/704; 427/226; 427/228; 427/379; 427/402; 264/29.4
[58] Field of Search .................................. 428/408, 426, 428/428, 432, 699, 701, 702, 446, 368, 389, 212, 704, 689; 427/226, 228, 379, 402, 421, 294, 419.1, 380; 264/29.4

[56] References Cited

U.S. PATENT DOCUMENTS

| | | | |
|---|---|---|---|
| 1,804,361 | 5/1931 | Marcin . | |
| 3,385,723 | 5/1968 | Pickar | 117/46 |
| 3,562,011 | 2/1971 | Hirst et al. | 117/234 |
| 3,927,181 | 12/1975 | Niimi et al. | 423/345 |
| 4,291,794 | 9/1981 | Bauer | 264/29.4 |
| 4,397,901 | 8/1983 | Warren | 428/101 |
| 4,472,476 | 9/1984 | Veltri | 428/215 |
| 4,487,804 | 12/1984 | Reven | 428/408 |
| 4,513,030 | 4/1985 | Milewski | 427/227 |
| 4,647,316 | 3/1987 | Prescott | 146/6.16 |
| 4,795,677 | 1/1989 | Gray | 428/246 |
| 4,833,025 | 5/1989 | Rossi | 428/357 |
| 4,837,073 | 6/1989 | McAllister et al. | 428/212 |
| 4,894,286 | 1/1990 | Gray | 428/408 |
| 4,988,362 | 1/1991 | Toriyama | 623/66 |
| 5,102,698 | 4/1992 | Cavalier et al. | 427/376 |
| 5,114,749 | 5/1992 | Nishio et al. | 427/226 |
| 5,133,993 | 7/1992 | Streckert et al. | 427/226 |
| 5,256,448 | 10/1993 | DeCastro | 427/228 |
| 5,294,460 | 3/1994 | Tani et al. | 427/228 |
| 5,380,475 | 1/1995 | Goedtke et al. | 264/29.5 |
| 5,399,378 | 3/1995 | Uemura et al. | 427/228 |
| 5,436,083 | 7/1995 | Haluska et al. | 428/688 |
| 5,438,083 | 8/1995 | Takimoto et al. | 523/401 |
| 5,536,574 | 7/1996 | Carter | 428/381 |
| 5,626,923 | 5/1997 | Fitzgibbons et al. | 427/535 |
| 5,725,955 | 3/1998 | Tawil et al. | 428/408 |

FOREIGN PATENT DOCUMENTS

| | | | |
|---|---|---|---|
| 0 415 217 A1 | 3/1991 | European Pat. Off. | C04B 41/89 |
| 0 747 334 A2 | 12/1996 | European Pat. Off. | C04B 41/50 |
| 36 22 437 | 10/1987 | Germany | C04B 35/52 |
| 810491 | 3/1959 | United Kingdom . | |
| 913 577 | 12/1962 | United Kingdom . | |
| 913577 | 12/1962 | United Kingdom . | |
| 983911 | 2/1965 | United Kingdom . | |
| 2 011 361 | 7/1979 | United Kingdom | C04B 35/34 |
| WO 88/07506 | 10/1988 | WIPO | C04B 41/85 |
| WO 93 10055 | 5/1993 | WIPO | C04B 35/80 |
| WO 95 26941 | 10/1995 | WIPO | C04B 41/45 |
| WO 97 42135 | 11/1997 | WIPO | C04B 41/52 |

*Primary Examiner*—Deborah Jones
*Assistant Examiner*—Abraham Bahta
*Attorney, Agent, or Firm*—Larry J. Palguta; Robert Desmond

[57] ABSTRACT

This invention describes the infiltration methods used to incorporate ceramic additives in carbon/carbon brake disc preforms. Aqueous vacuum infiltration techniques were employed. Both methods were effective in achieving homogeneous dispersion of ceramic additives throughout brake disc thickness. Heat treatment processes were developed to convert oxide additives to more refractory phases. Both temperature and $N_2$ overpressure were precisely controlled during conversion. By using the additives, infiltration routes, and heat treatment schedules, brake disc friction material performance properties such as friction coefficient, friction coefficient stability, and brake disc wear rate are improved. The disclosed carbon/carbon brake discs can be used in aerospace, automotive and other friction material applications.

26 Claims, No Drawings

CARBON/CARBON FRICTION MATERIAL

This patent application is a continuation-in-part of patent application Ser. No. 08/833,756 filed Apr. 9, 1997 now abandoned.

BACKGROUND OF THE INVENTION

This invention relates to improvements in carbon/carbon friction material performance and chemical vapor infiltration (CVI) densification rate through the incorporation of ceramic additives. Specifically, colloidal ceramic additives, e.g. silica and aluminum oxide, were infiltrated into PAN and pitch-based carbon fiber preforms to achieve improvements in densification time or rate and performance characteristics.

Carbon/carbon brake discs have gained wide acceptance on both commercial and military aircraft. This trend can be attributed to the increased brake performance requirements for newer aircraft and the unique physical, thermal, and chemical properties of carbon. On the commercial side, the advent of wide-bodied jets required the need for improved brake materials simply because traditional steel brake systems were inadequate to absorb all the thermal energy created during landing. Steel could only be used if additional heat sink were available. But due to the demand for lower weight systems, this was not feasible. Also, carbon possesses very unique properties. Its heat capacity, thermal conductivity, high temperature strength and density make it the ideal material for the demanding conditions which often occur during aircraft landings. On the military side, weight and thermal properties also made carbon the material of choice. Only carbon's unique properties meet the performance requirements demanded for rigorous military applications.

General methods for the production of carbon/carbon composite materials, including brake friction materials, have been extensively described in both patents and the open literature e.g. Buckley, J. and Edie, D., eds., *Carbon-Carbon Materials and Composites*, Noyes Publications, Park Ridge, N.J., 1993. To summarize, two commonly used production methods exist. The first method comprises molding a carbon fiber composite with some carbonizable resin, typically phenolic; carbonizing the composite "preform" and then densifying the now porous material using CVI and/or resin impregnation processes. CARBENIX® 2000 series materials (AlliedSignal Inc.) are typical of this type. The second method comprises using textile methods to build up an all-fiber preform with subsequent densification using CVI. CARBENIX® 4000 series materials (AlliedSignal Inc.) are typical of this type.

In both types of brake discs, the final density is usually substantially less the theoretical density of graphitic carbon (2.2 g/cc) This can be attributed in small part to the different structural types of carbon comprising the brake disc (graphitic, glassy, and pyrolytic). Mainly this is due to the continued presence of interconnected pore networks and closed pores remaining because of incomplete densification. Further densification is possible if continuous pore channels are open to the surface of the brake disc. Low viscosity solutions such as furfuryl alcohol are sometimes used effectively to provide small enhancements in final density. But small enhancements don't come without increased processing and materials cost, consequently techniques such as these aren't widely used in industry. Up to 10–15 volume percent porosity does remain in the final brake disc microstructure. It is highly desirable to improve densification time or rate.

Carbon/carbon brake disc friction performance is dictated by carbon microstructure produced through processing. As discussed above, numerous types, or polymorphs, of carbon can be found in the final brake microstructure. The structure of pyrolytic carbon can be varied depending on the deposition parameters during CVI processing. Terms such as rough and smooth laminar have been used to describe certain types of CVI deposited carbon structures, and amounts are optimized for friction and wear applications. Physical properties such as tensile strength and hardness are important criteria when optimizing overall brake disc friction and wear. Additionally, heat treatment temperatures play a large role in determining final microstructure and hence performance. The amount of graphitization, for instance, can immensely effect frictional properties. Graphite can be a good solid lubricant if basal planes are oriented in the proper direction, which would have major effects on friction and wear properties. Overall brake performance will be controlled by the individual components; fibers and type of matrix material in contact with the friction surface. This poses an infinite number of ways in which performance specific material properties can be engineered into brake microstructures. It is highly desirable not only to improve densification rate but to improve the friction performance of the brake disc.

BRIEF DESCRIPTION OF THE INVENTION

This invention relates to the improvement of carbon/carbon brake disc performance and CVI densification rate through the incorporation of ceramic additives via infiltration with colloidal ceramics and subsequent conversion to refractory materials. With these additives, performance characteristics such as friction coefficient, wear, and friction stability are enhanced. Additionally, additive incorporation was found to increase both CVI deposition rate and final bulk density. The present invention comprises a process of making a carbon/carbon composite friction material member, comprising the steps of providing a colloidal ceramic solution comprising one of $SiO_2$ and $AlO(OH)$, controllably infiltrating the colloidal cerramic solution into a carbon/carbon preform, drying the preform, heating the preform to convert the colloidal ceramic to a respective refractory material of SiC and AlN, densifying the preform with elemental carbon to provide the preform with a matrix of carbon, and heat treating the preform to graphitize the carbon/carbon preform and carbon matrix and provide the carbon/carbon composite friction material member. The materials, infiltration procedures, heat treatment cycles, and testing procedures used are described below.

DETAILED DESCRIPTION OF THE INVENTION

Additives used as friction modifiers were selected according to a stringent set of thermal, physical, and chemical requirements. Materials such as $SiO_2$, $AlO(OH)$, and $TiB_2$ were predicted and experimentally found not to be stable under the conditions. However, both $SiO_2$ and $AlO(OH)$ transform to more stable SiC and AlN under processing, so the oxides were used as precursors to these materials. In fact, since these oxide precursors are available in colloidal form, they make a highly desirable route for introduction of SiC and AlN into porous carbon/carbon disc preforms.

Once materials were selected, infiltration routes were developed. In a typical colloidal infiltration process, preform open pore volume is measured using standard butanol absorption tests. Given a desired volume or weight percent additive, commercial colloidal materials (e.g. LUDOX®

AS-40, DuPont) are diluted so that the amount of additive contained in the measured open pore volume is equal to the desired volume %, based on the total volume of the preform.

In water-based systems, mechanical assistance was needed for infiltration because of the non-wetting behavior between water and carbon preforms. When the preforms were placed in a large container of slurry, they would simply float or fluid would not penetrate the pores as desired, so weights were placed on top preforms to submerge the preform during infiltration. To get good infiltration, vacuum assistance was used. A typical process to achieve full infiltration is described below. A full-scale preform was placed in a container with approximately 5 gallons of prepared additive solution. A weight was used to submerge the preform in the solution. Approximately 3" of liquid was left between the top of the preform surface and the liquid surface. The preforms were supported by three pieces of ¼" milling media on the bottom surface. This helped fluid flow by ensuring that particle infiltration was occurring from all preform surfaces, not just from the sides and top. The isostatic liquid pressure ensured thorough infiltration and particle distribution after drying. Once immersed, the vacuum would be turned on and slowly brought to 15 "Hg and held for 5 minutes. Upon doing this, bubbles were seen escaping from all preform surfaces, and liquid level would drop according to the volume of air displaced. After the 5 minute hold, the vacuum would be released slowly, and the pressure would return to atmospheric conditions. This entire process would be repeated two more times to ensure infiltration was complete. After going through the three sequences of infiltration, preforms were removed from the bath and weighed to determine the extent of infiltration. By knowing the solids loading of the additive in solution and the amount of open porosity in the starting preform, the percent pore filling could be calculated. Such control of the amount of solids infiltrated is important to obtaining the desired friction wear characteristics. Such control is not provided in Great Britain Patent No. 913,577 which discloses a silica sol treatment for elemental carbon that achieves maximum penetration to provide a fully densified elemental carbon.

After infiltration, the liquids used in suspending the additives need to be removed from the pores in the preform. This was done by simple convection drying. The preforms saturated with water were placed on end in a drying oven maintained at 80° C. A circulating fan ensured that evolving water vapor was carried off the preform surface and out of the oven. Temperature needed to be closely controlled so water was not boiled. If a temperature of 100° C. was used instead of 80° C., water would vigorously percolate through the internal porosity of the preform to the surface. Consequently, a large amount of additive would end up on the outer surface when drying was complete. Boiling was found to turn an initial homogeneous distribution of both particle or colloid distribution into a very nonhomogenous distribution. The net effect was that a lot of material was transported to the preform surface, which had initially been deposited internally during infiltration. Infiltrated preforms were dried a total of twelve hours. By knowing the initial brake disc preform weight and amount of solids deposited, complete liquid removal could be determined by weighing. Twelve hours was sufficient drying time in all tests run.

After drying is completed, preforms containing colloidal $SiO_2$ and $AlO(OH)$ need to be converted to SiC and AlN, respectively. The heat treatment developed was used for both colloids. The conversion starts by heating the infiltrated preform to 200° C. at a rate of 10° C./hr. At 200° C., a hold time of 15 minutes was used. Further heating at 20° C./hr. is used after the hold, up to 1600° C. Once at 1600° C., the preform is held for 4 hours. Upon finishing the hold, the sample is cooled back to room temperature in 2 hours and removed. The atmosphere for the conversion is held at 3 psig of $N_2$ for the entire heat treat cycle. Upon analysis, the samples show all of the $SiO_2$ converting to SiC, and all the AlO(OH) converting to AlN. Closer inspection shows the converted particles to be extremely small, on the order of 100 nanometers. SiC particles were seen to completely coat the pitch carbon fibers (CARBENIX® 2000 series preforms), forming a dense, pore-free surface coating. Additional SiC particulates were seen scattered around on the matrix material in a very "lace-like" configuration. Conversion of colloidal materials infiltrated into PAN-based preforms (CARBENIX® 4000 preforms) had a completely different morphology after conversion. The resultant particles were actually 10–20 micron agglomerates, composed of smaller 1 micron SiC particles. This drastic difference in morphologies can be attributed to the preform-type. As seen from infiltration results, the pitch-based preforms tend to be much better wetted with the colloidal $SiO_2$ solutions than the PAN-based preform. This is probably due to the higher heat treatment of the pitch-based preform. In any event, the $SiO_2$ solution is capable of forming thin films wherever the solution can penetrate during infiltration. During conversion, these thin films are maintained as either thin, dense SiC coatings on the fibers, or "lace-like" particles on the matrix material. In the case of PAN-based preforms, as found in infiltration, the $SiO_2$ solution does not wet the fiber. Consequently, as drying commences, the liquid pools on the fiber surface as the water volume decreases. Upon complete drying, 20–30 micron agglomerates are found to be attached to fiber surfaces. These structures are maintained after conversion. This is a very important feature when considering use for these materials in tribological type applications. Particle size is known to play a considerable role in both the wear and friction in C/C brake discs with additive additions. Small particle size is expected to increase friction coefficient without adversely effecting brake disc wear. Alternatively, large particles are expected to increase friction coefficient, but drastically increase wear also.

Preform densification is accomplished using chemical vapor infiltration (CVI). Normal processing techniques entail introducing a carbon precursor gas into the furnace, where decomposition of the gas results in carbon deposition. Important parameters include temperature, gas composition, and gas flow. The particular type of carbon deposited can be varied with precise control of pressure, temperature, and gas composition. Because of the normal diffusion barrier associated with trying to uniformly densify articles with thick cross-sections, multiple stage processing is often used. Typical densification cycles are hundreds of hours long in multiple cycles. Upon completion of the first stage of processing, the brake disc preforms are removed and surface ground. The grinding is done to reopen surface pore channels blocked during CVI. After grinding, the partially densified preforms are returned to the CVI furnace and undergo additional processing. Densification is followed by heat treatment (1600–2800° C.) to produce a carbon or graphite of the desired crystal structure. Final machining then provides a finished carbon/carbon friction material disc.

One of the benefits of using SiC derived from $SiO_2$ was that a 50% greater weight gain was observed in the first 300 hours of densification than for preforms without additive addition. Preforms were within specifications in 300 hours, compared to the 700 hours normally needed to reach a density of 1.70 g/cc. Additionally, preforms containing additives were found to have densities higher than what was normally seen for undoped brakes. Final densities 2–3% higher than normal were observed with low levels of colloidal silica derived SiC.

EXAMPLES

Example #1

A random fiber preform (CARBENIX® 2000 series) was infiltrated with colloidal $SiO_2$ with amounts equal to 0.5% volume SiC addition after conversion. The preform had 40 vol % porosity at this stage in its processing. Infiltration was carried out using the standard vacuum infiltration described previously. After drying, standard heat treatment practices were used to convert the $SiO_2$ to SiC. With completion of conversion, the preform was densified using standard CVI methodology.

Deposition rates were seen to increase dramatically with preforms containing colloidally-derived SiC. Preforms containing SiC were seen to reach densities of 1.70 g/cc in as short as 300 hrs. Preforms not containing additive reach density of 1.70 g/cc usually after 700 hrs. of processing. This represents a 2.3× decrease in processing time.

The finished brake material underwent performance testing on a 12" dynamometer using a standard landing sequence. The performance results showed the brake materaial to have a wear rate of 0.06 in/s/s×$10^{-4}$, compared to an undoped brake material (Carbenix® 2300) with an average wear rate of 0.14 in/s/s×$10^{-4}$, an improvement of 2.3×. Differences in the effectiveness of the two brake materials were not significant. Similar results were achieved with low levels of colloidal AlO(OH) derived AlN.

Example #2

A random fiber preform (CARBENIX® 2000 series) was infiltrated with colloidal silica to yield a volume % SiC of 9.7%. Drying, conversion and densification were accomplished as described previously. Final density was 1.84 g/cc. The finished material was tested on a 12" dynamometer using a standard landing sequence. This material showed an effectiveness (friction coefficient) of 0.457 compared with a typical effectiveness for undoped material of 0.320.

Example #3

A non-woven preform (CARBENIX® 4000 type) was infiltrated with colloidal silica to yield a volume % SiC of 1.2%. Drying, conversion and densification were accomplished as described previously. Using a standard CVI process, a final density of 1.79 g/cc was achieved. Typical densities achieved without infiltration for this material are 1.69–1.72 g/cc.

Example #4

A partially densified, non-woven preform (CARBENIX® 4000 type) was infiltrated with colloidal silica to yield SiC volume of 0.5%. Drying, conversion and densification were accomplished as described previously. Final density was ~1.70 g/cc. Over five tests on a 12" dynamometer, using a standard landing sequence, measured effectiveness (friction coefficient) was 0.517, compared to a baseline, non-infiltrated material which had measured average effectiveness of 0.285.

We claim:

1. A process of making a carbon/carbon composite friction material member, comprising the steps of:
   providing a colloidal ceramic solution comprising one of $SiO_2$ and AlO(OH),
   controllably infiltrating the colloidal ceramic solution into a carbon/carbon preform,
   drying the preform,
   heating the preform to convert the colloidal ceramic to a respective refractory material of SiC and AlN,
   densifying the preform with elemental carbon to provide the preform with a matrix of carbon, and
   heat treating the preform to graphitize the carbon/carbon preform and carbon matrix and provide the carbon/carbon composite friction material member.

2. The process in accordance with claim 1, wherein the infiltration step includes submerging the preform in a quantity of the colloidal ceramic solution.

3. The process in accordance with claim 2, wherein the infiltration step includes maintaining the preform and solution under a vacuum during infiltration.

4. The process in accordance with claim 3, wherein the infiltration step includes maintaining the vacuum at 15 inches Hg for approximately five minutes during infiltration.

5. The process in accordance with claim 4, wherein the infiltration step includes releasing the vacuum to atmospheric pressure and then repeating more than one time the imposition of vacuum at 15 inches Hg and approximately five minutes hold time during infiltration.

6. The process in accordance with claim 1, wherein the drying step includes drying at a temperature of less than the boiling point of the solution.

7. The process in accordance with claim 6, wherein drying step includes drying by convection.

8. The process in accordance with claim 7, wherein the drying step includes drying at approximately 80° C. for approximately 12 hours.

9. The process in accordance with claim 1, wherein the conversion step comprises the steps of heating to approximately 200° C., holding at that temperature for approximately 15 minutes, heating up to approximately 1600° C., holding at that temperature for approximately 4 hours, and cooling to room temperature in approximately 2 hours.

10. The process in accordance with claim 1, wherein the conversion step includes an atmosphere of $N_2$ at approximately 3 psig.

11. The process in accordance with claim 1, wherein the conversion step provides particles of approximately 100 nanometers in size for molded preforms and approximately 10–20 micron size agglomerates for nonwoven preforms.

12. The process in accordance with claim 1, wherein the densification step is by means of carbon vapor infiltration and takes less than 700 hours.

13. The process in accordance with claim 1, wherein the densification step is by means of carbon vapor infiltration and takes approximately 300 hours.

14. The process in accordance with claim 1, wherein the densification step is by means of carbon vapor infiltration and is acomplished within the range of approximately 300 to 700 hours.

15. The process in accordance with claim 14, wherein the heat treatment is accomplished within the temperature range of approximately 1600–2800° C.

16. The process in accordance with claim 1, further comprising the step of machining the carbon/carbon composite friction material member.

17. The process in accordance with claim 1, wherein the friction material member comprises an aircraft brake disc.

18. A process of making an improved carbon/carbon composite friction material member requiring a reduced densification time and having an improved wear rate, comprising the steps of:

provided a colloidal ceramic solution comprising one of $SiO_2$ and AlO(OH), controllably infiltrating the colloidal ceramic solution into a carbon/carbon preform to effect a homogenous distribution of the colloidal ceramic solution in the preform, drying the preform, heating the preform to convert the colloidal ceramic to a respective refractory material of SiC and AlN which is homogenously distributed within the preform, densifying the preform with elemental carbon by carbon vapor infiltration for approximately 300 to 700 hours to provide the preform with a matrix of carbon, and heat treating the preform to graphitize the carbon/carbon preform and carbon matrix and provide the carbon/carbon composite friction material.

19. A carbon/carbon composite friction material member, comprising a carbon/carbon preform densified with a carbon matrix and graphitized by heat treating, and one of a colloidal ceramic refractory material comprising SiC and AlN distributed homogenously within the member by means of controllable infiltration of a colloidal ceramic solution comprising one of $SiO_2$ and AlO(OH) subsequently dried and heated to convert the colloidal ceramic to the respective refractory material.

20. The frictrion material member in accordance with claim 19, wherein the controllable infiltration included submerging the preform in the colloidal ceramic solution and maintaining the preform and solution under a vacuum during infiltration.

21. The frictrion material member in accordance with claim 19, wherein the drying included drying at a temperature of less than the boiling point of the solution.

22. The frictrion material member in accordance with claim 19, wherein the conversion comprised heating to approximately 200° C., holding at that temperature for approximately 15 minutes, heating up to approximately 1600° C., holding at that temperature for approximately 4 hours, and cooling to room temperature in approximately 2 hours.

23. The frictrion material member in accordance with claim 19, wherein the refractory material comprises particles of approximately 100 nanometers in size for molded preforms and approximately 10–20 micron size agglomerates for nonwoven preforms.

24. The frictrion material member in accordance with claim 19, wherein the densification comprised carbon vapor infiltration and was acomplished within the range of approximately 300 to 700 hours.

25. The process in accordance with claim 1, wherein the refractory material comprises approximately 0.5 to 9.7% by volume of the friction material member.

26. The friction material member in accordance with claim 19, wherein the refractory material comprises approximately 0.5 to 9.7% by volume of the friction material member.

* * * * *

UNITED STATES PATENT AND TRADEMARK OFFICE
CERTIFICATE OF CORRECTION

PATENT NO. : 5,962,135
DATED : October 5, 1999
INVENTOR(S) : Walker, et al.

It is certified that error appears in the above-identified patent and that said Letters Patent is hereby corrected as shown below:

On the cover page, entry [22], delete "Oct. 3, 1997" and insert --Oct. 30, 1997--.

Signed and Sealed this

Second Day of May, 2000

Attest:

Q. TODD DICKINSON

*Attesting Officer*  *Director of Patents and Trademarks*